United States Patent
Yamamoto et al.

(10) Patent No.: US 6,915,403 B2
(45) Date of Patent: Jul. 5, 2005

(54) APPARATUS AND METHOD FOR LOGICAL VOLUME REALLOCATION

(75) Inventors: Yasutomo Yamamoto, Sagamihara (JP); Takashi Oeda, Sagamihara (JP); Takao Sato, Odawara (JP)

(73) Assignee: Hitachi, Ltd., Tokyo (JP)

( * ) Notice: Subject to any disclaimer, the term of this patent is extended or adjusted under 35 U.S.C. 154(b) by 573 days.

(21) Appl. No.: 09/825,607

(22) Filed: Apr. 3, 2001

(65) Prior Publication Data

US 2002/0144076 A1 Oct. 3, 2002

(30) Foreign Application Priority Data

Feb. 28, 2001 (JP) .......................................... 2001-053472

(51) Int. Cl.⁷ .......................... G06F 12/00; G06F 12/10
(52) U.S. Cl. ...................... 711/202; 711/4; 711/154; 711/165; 711/206; 711/209; 711/6
(58) Field of Search ............................ 711/113, 114, 711/4, 165, 154, 202, 206, 203, 205, 207, 208, 209, 2, 6

(56) References Cited

U.S. PATENT DOCUMENTS

| | | | | |
|---|---|---|---|---|
| 5,845,319 A | * | 12/1998 | Yorimitsu | 711/114 |
| 5,956,750 A | * | 9/1999 | Yamamoto et al. | 711/167 |
| 6,145,028 A | * | 11/2000 | Shank et al. | 710/31 |
| 6,216,202 B1 | * | 4/2001 | D'Errico | 711/112 |
| 6,397,292 B1 | * | 5/2002 | Venkatesh et al. | 711/114 |
| 6,446,161 B1 | * | 9/2002 | Yamamoto et al. | 711/114 |
| 6,467,014 B1 | * | 10/2002 | Bolt | 711/4 |
| 6,484,234 B1 | * | 11/2002 | Kedem | 711/113 |
| 6,529,995 B1 | * | 3/2003 | Shepherd | 711/114 |
| 6,564,219 B1 | * | 5/2003 | Lee et al. | 707/100 |
| 2001/0023463 A1 | * | 9/2001 | Yamamoto et al. | 710/6 |
| 2002/0004845 A1 | * | 1/2002 | Yamamoto et al. | 709/240 |

* cited by examiner

Primary Examiner—Mano Padmanabhan
Assistant Examiner—Jasmine Song
(74) Attorney, Agent, or Firm—Townsend and Townsend and Crew LLP

(57) ABSTRACT

A host computer requests a storage device to perform a data transfer operation using information about the data transfer source/destination regions as a parameter. The storage device internally transfers data from a source disk device to a destination disk device. When the transfer of the data is completed, the storage device notifies the host computer that the operation has been completed. The host computer receives the notification and updates the storage location of the data to the destination region.

11 Claims, 12 Drawing Sheets

FIG.3

LV management information 300

| | |
|---|---|
| PV list | 301 |
| LE count | 302 |
| LE size | 303 |
| LE-PE mapping information | 310 |

LE-PE mapping information 310

| LE number | PV name | PE number |
|---|---|---|
| 0 | /dev/dsk/c0t0d0 | 500 |
| 1 | /dev/dsk/c0t0d0 | 501 |
| 2 | /dev/dsk/c0t0d0 | 502 |
| 3 | /dev/dsk/c0t0d0 | 503 |
| ⋮ | ⋮ | ⋮ |
| 499 | /dev/dsk/c0t0d0 | 999 |
| 500 | /dev/dsk/c1t0d0 | 100 |
| 501 | /dev/dsk/c1t0d0 | 101 |
| 502 | /dev/dsk/c1t0d0 | 102 |
| | ⋮ | |

FIG.4

PV management information 400

| LV list | 401 |
| PE count | 402 |
| PE size | 403 |
| PE-LE mapping information | 410 |

PE-LE mapping information 410

| PE number (411) | LV name (412) | LE number (413) |
|---|---|---|
| 0 | /dev/vg0/lv other | 0 |
| 1 | /dev/vg0/lv other | 1 |
| 2 | /dev/vg0/lv other | 2 |
| 3 | /dev/vg0/lv other | 3 |
| ⋮ | ⋮ | ⋮ |
| 499 | /dev/vg0/lv other | 499 |
| 500 | /dev/vg0/lv0 | 0 |
| 501 | /dev/vg0/lv0 | 1 |
| 502 | /dev/vg0/lv0 | 2 |
| | ⋮ | |

Data transfer region information 145

APPARATUS AND METHOD FOR LOGICAL VOLUME REALLOCATION

FIELD OF THE INVENTION

The present invention relates to a computer system including a host computer (host) and a storage device connected to the host. More specifically, the present invention relates to a feature supporting the moving of data stored in the storage device of the computer system.

BACKGROUND OF THE INVENTION

When constructing a computer system, the system is generally designed to avoid bottlenecks in resources such as networks and disk devices. In particular, external storage devices, which are slower than processors and the like, tend to be performance bottlenecks. Various measures are taken to overcome this in the design of systems. One of these is the optimization of the data storage formats used in the storage device.

For example, data access performance can be improved by storing frequently accessed data on high-speed disk devices and by distributing data across multiple disk devices. Also, when using RAID Redundant Array of Independent Disks) devices, data storage suited for access performance can be provided by determining a RAID level (redundancy structure) based on the sequentialness of data accesses to the RAID device.

In terms of system design, disk device capacity allocated for different sets of data must take into account the data storage formats used in the system. More specifically, this corresponds to determining the region sizes in database tables in a database and file system (FS) sizes in file systems. Generally, the amount of data that is handled increases with the usage of the computer system. Thus, when the system is being designed, the past performance in related operations and the like must be used to predict a rate of increase in data volume. The disk device capacities must be allocated so that there is enough free space to handle the predicted increases in data volume during a maintainable period. The data regions are determined based on this.

In designing systems in this manner, the combination of storage devices and data storage formats must take into account improvements in data access performance and increases in data volume. One means to assist in determining this combination is a Logical Volume Manager (LVM).

An LVM takes a partial region in an actual disk device and provides it to the host as a logically unified volume (this is referred to as a logical volume and will be referred to below as "LV"). The LVM manages LVs and also creates, deletes, and resizes (enlarges/shrinks) LVs.

The LVM also includes a mirroring function for providing redundancy in LVs and a striping function that arranges multiple physical volumes (PVs) in a dispersed manner.

When an LVM is used, the user places regions for storing data such as database tables and FSs not in PVs but in LVs. This facilitates the selection or management of data storage formats. For example, by placing the FS on an LV, an FS that can generally only be assigned to one disk device or one partition thereof can span across multiple disk devices. Also, by expanding LVs as file sizes increase, the FS can be expanded (reconstructed) with minimal work.

SUMMARY OF THE INVENTION

As the computer system is operated, it may be necessary to reevaluate the data storage format. This may happen due to a reevaluation of the operation model that was assumed when the system was designed, e.g., changes in data access trends or characteristics or changes in data volume not reflected in the initial estimation, or due to changes in physical resources, e.g., the addition of disk devices or replacement of resources with higher-speed replacements, or due to factors necessitated due to the data management system, e.g., defragmenting LVs and database tables fragmented due to repeated resizing. In such cases, system performance can be improved by reevaluating the data storage format and rearranging the data.

However, in conventional technologies, rearranging data stored in the storage device requires data transfers involving the host.

The following is an outline of the procedure involved in a data rearrangement operation in which an LV spanning multiple PVs is brought together in a single PV.

(1) A region with a size corresponding to the LV to be processed is allocated on the PV.

(2) The host reads data from the LV and writes it to the new LV region.

(3) Repeat (2) until all the data has been copied. Then update LV-PV mapping information.

Reconstructing an LV in this manner results in a high volume of data, i.e., the entire LV, being transferred. Thus, there is a large amount of input/output (I/O) at the source and destination PVs. Also, the host and channel assume a high load, and this can negatively affect the performance of other running operations involving data from other LVs.

Also, when performing this type of data rearrangement operation, access to the data being rearranged must be restricted at least for data updates. For example, when reconstructing an LV, the LV would be generally taken off-line (unmounted in UNIX (UNIX is a registered trademark in the U.S. and other countries of the X/Open Company, Ltd.)) and is then put back on-line (mounted in UNIX) to restrict access to the data while it is being rearranged. Since the LV involved in data accesses is taken off-line, operations that use the LV will be blocked during the data rearrangement operation.

As a result, data rearrangement operations such as LV rearrangement must be performed during a period when operations that access the data can be interrupted for a predetermined time. This creates a time-related restriction to maintenance operations for the computer system.

The object of the present invention is to reduce the load to hosts and channels during the transfer of data from a source data region to a destination data region performed in rearrangement operations of data stored in a storage device.

Another object of the present invention is to reduce as much as possible the period during which data is accessible due to a data rearrangement operation and to reduce the time during which operations that use the data is interrupted.

To achieve these objects, the present invention provides an information processing system including a host computer and a storage device connected to the host computer and equipped with a plurality of disk devices. The host computer includes a table containing information mapping the relationship between the plurality of disk devices and logical storage regions. The host computer also includes means for retrieving retrieving information indicating a destination disk device range when data recorded in one of the disk devices of the plurality of disk devices is to be moved to another disk device. The host computer also includes means for transferring transferring the information retrieved by retrieving means to the storage device. The host computer also includes means for updating information registered in the table when the moving of data is completed. Also, the storage device includes means for copying looking up the information transferred by transferring means and copying data from the source to the destination disk device.

By performing data transfers in the storage device using the configuration above, the load on the host and the channel generated by the data transfer can be reduced.

Also, instead of having the data transfer operation in the storage device performed simply by copying from region to region, it would also be possible to temporarily form a pair for maintaining content synchronization between the source and destination data regions. During the data transfer and after the data transfer is completed, data updates performed on the source data region are all reflected at the destination.

Also, while data transfer is being performed in the storage device, data access by the host computer to the data being transferred can be blocked.

Also, it would be possible to have the storage device rather than the host computer manage logical storage regions in the disk devices.

BRIEF DESCRIPTION OF THE DRAWINGS

FIG. 3 is a drawing showing the structure of LV management information according to the present invention.

FIG. 4 is a drawing showing PV management information according to the present invention.

DESCRIPTION OF THE PREFERRED EMBODIMENTS

Figure 1:
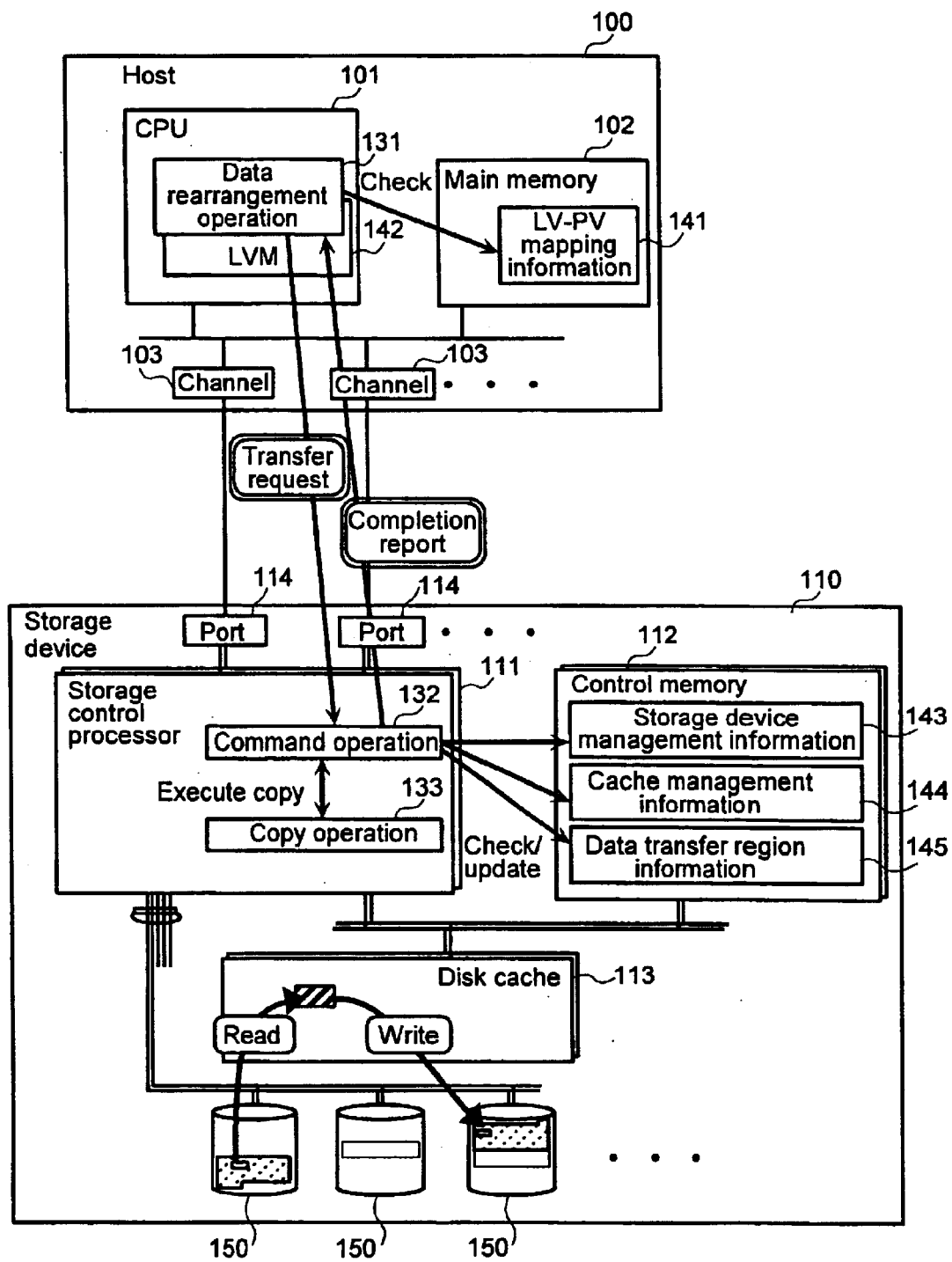
FIG. 1 is a block diagram of a computer system involving a first embodiment of the present invention.

FIG. 1 is a drawing showing an architecture of a first embodiment of a computer system in which the present invention is used.

The computer system according to this embodiment includes a host 100 and a storage device 110. The host 100 and the storage device 110 are connected by a communication line such as a SCSI bus. Communication between the two devices take place through the communication line.

The host 100 includes a CPU 101, a main memory 102, and a channel 103. These elements are connected by an internal bus.

The CPU 101 executes application programs such as databases. An operating system and software associated with the operating system are executed on the CPU 101 to provide input/output control for the storage device 110 and memory allocation when an application program is running. An LVM 142 is one of the software entities associated with the operating system. The LVM 142 provides the PV storage area of the storage device 110 to application programs in the form of virtual LVs.

In this embodiment, the CPU 101 executes the LVM 142. The LVM 142 controls LVs using the LV-PV mapping information 141, described later, and the like.

The main memory 102 stores application programs, the operating system, object code for executing software associated with the operating system such as the LVM, data used by software, control information, and the like.

FIG. 3 and FIG. 4 show tables from the LV-PV mapping information 141.

The LV-PV mapping information 141 contains information indicating the PVs mapped to LVs (or LVs mapped to PVs). In the LV-PV mapping information 141, each LV (or PV) is assigned an LV management information 300 or a PV management information 400.

The LV management information 300 includes entries for a PV list 301, an LE count 302, an LE size 303, and an LE-PE mapping information 310.

The PV list 301 contains information of the PV mapped to the LV. LVs and PVs are divided up into LE (Logical Extent) and PE (Physical Extent) regions having the same size. A greater degree of freedom in the physical arrangement of LVs is allowed by assigning LEs to PEs. The LE count 302 contains the number of LEs present in the LV. The LE size 303 contains information indicating LE size. LE-PE mapping information 310 entries include an LE number 311, a PV name 312 associated with the LE, and a PE number 313. The LE-PE mapping information 310 contains information of the PEs mapped to LEs.

The PV management information 400 provides the opposite of the LV management information, indicating information about LVs assigned to PVs.

The PV management information 400 includes entries for an LV list 401, a PE count 402, a PE size 403, and a PE-LE mapping information 410.

The LV list 401 contains information indicating the LV assigned to the PV. The PE count contains the number of PEs present in the PV. The PE size 403 contains information indicating PE size. The PE-LE mapping information 410 contains entries for a PE number 411, an LV name 412 associated with the PE, and an LE number 413. The PE-LE mapping information 410 contains information of the LEs mapped to PEs.

In addition to the information described above, the main memory 102 stores information needed to access PVs. For example, path information used to access PVs is stored in the form of a number for the connection channel 103, a number for a port 114 of the storage device 110, and a device number (hereinafter referred to as a PV number) in the storage device 110.

The channel 103 is a controller controlling input/output operations with the storage device 110 by way of the communication line. The channel 103 provides communication protocol control such as for the sending of request commands over the communication line, completion report notifications, data transfers, communication phase control, and the like. If the communication line is a SCSI bus, a SCSI adapter card will serve as the channel 103.

The storage device 110 includes: a port 114 controlling the connection with the host; a disk device 150; a storage control processor 111; a control memory 112; and a disk cache 113. Usefulness of the storage device 110 is improved by providing redundancy for the different elements of the storage device 110. Thus, if one of the elements fails, the remaining working elements can continue operations in a degraded mode.

If the storage device 110 is a RAID system in which multiple disk devices 150 are connected, the storage control processor 111 provides emulation through logical-physical mapping management. This allows the multiple disk devices 150 to be perceived by the host 100 as one or multiple logical disk devices. In order to simplify the discussion, however, the PVs accessed by the host 100 in this embodiment, i.e., the logical disk device in the storage device 110, will be assumed to have a one-to-one relationship with the disk device 150.

The storage control processor 111 receives PV accesses from the host 100, controls data transfers between the disk device 150 and the disk cache 113, controls data transfers between the disk cache 113 and the host 100, manages logical-physical mappings for the disk device 150 in the storage device 110, manages regions in the disk cache 113, and the like.

The disk cache 113 temporarily stores write data from the host 100 and read data from the disk device 150 before the data is sent to its destination. The data stored in the disk cache 113 is handled using an LRU (Least Recently Used) system or the like. Using the disk cache 113, write data can be written to the disk device 150 asynchronously relative to I/O requests from the host. Methods for controlling the cache in this manner are widely known in the art and their descriptions will be omitted.

The control memory 112 stores tables with various types of control information used by the storage control processor 111 to control input/output operations for the disk device 150. The control information tables include: a cache management information 144 used to manage allocations of regions in the disk cache 113; a storage device management information 143 used to manage mappings between logical disk devices and the disk devices 150 and the like; and a data transfer region information 145 used to manage the regions indicated by the host 100 in data transfer operations and progress status of data transfer operations, and the like.

Figure 5:
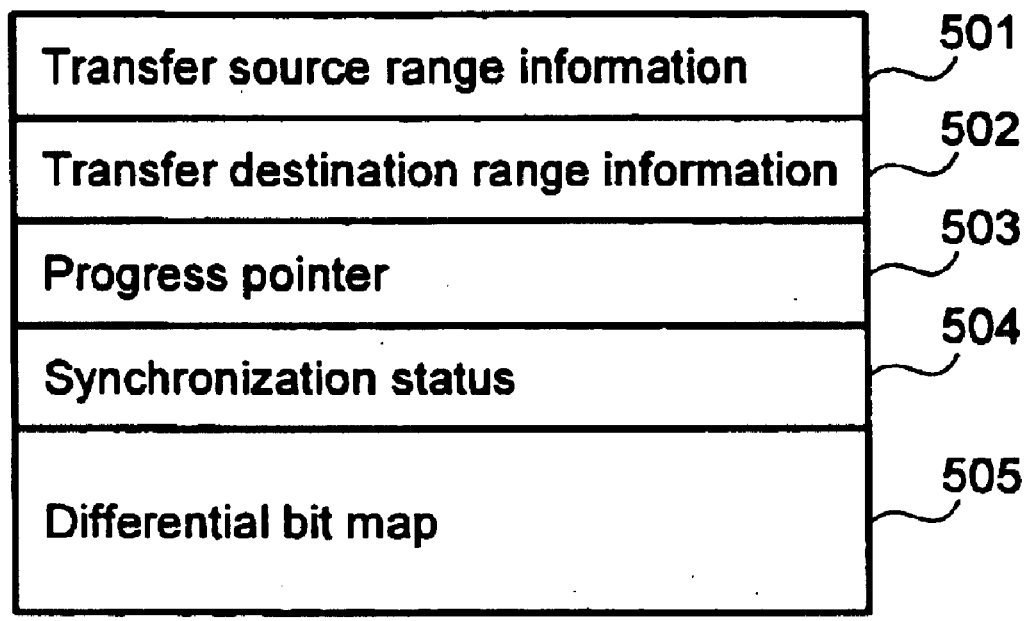
FIG. 5 is a drawing showing data transfer region information according to the present invention.

FIG. 5 is a table showing the data transfer region information 145.

A transfer source range information 501 and a transfer destination range information 502 contains information indicating the data region ranges to be used in a data transfer performed in response to an instruction from the host 100. To allow cases where the data regions in the transfer source/destination are fragmented, this embodiment uses the transfer source range information 501 and the transfer destination range information 502 to store lists. For each continuous sub-region, the PV number containing the sub-region, the starting position indicated by a relative address within the PV, and size are entered. The total sizes of the transfer source/destination data regions must be identical.

The progress pointer 503 contains information indicating the amount of data that has been transferred by the data transfer operation. Progress of the data transfer operation can be managed using the information in the progress pointer 503. A synchronization status 504 and a differential bit map 505 are not used in this embodiment so their descriptions will be omitted.

The following is a description of the operations of the CPU 101 and the storage control processor 111 in this embodiment.

Figure 2:
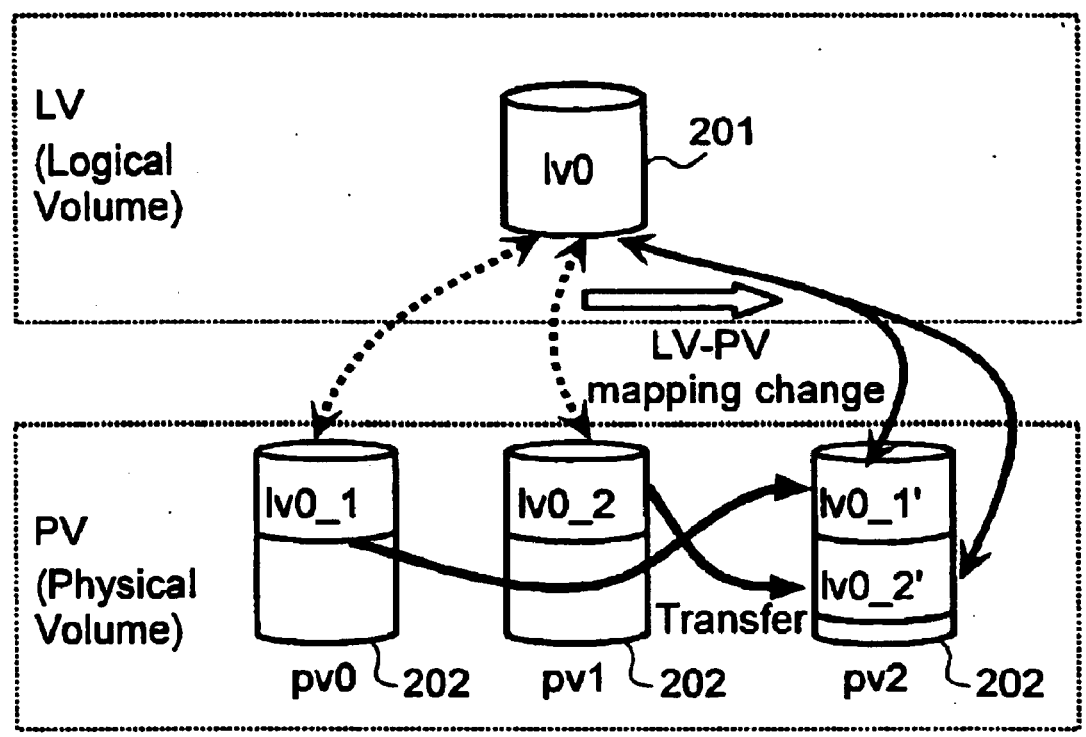
FIG. 2 is a schematic drawing showing a data rearrangement operation used to illustrate the present invention.

If, based on information such as mappings of LVs to PVs, a user or a maintainer determines that a specific LV needs to be reconstructed, an LV reconstruction instruction is given. For this embodiment, the following description will present a case in which, as shown in FIG. 2, lv0 is stored as lv0_0 and lv0_1 in two physical volumes, pv0 and pv1. An instruction is given to move lv0 to newly allocated lv0_0' and lv0_1' in pv2.

The reconstruction of the LV is performed through both a data rearrangement operation 131 running on the CPU 101 and a command operation 132 running on the storage control processor 111 of the storage device 110.

Figure 6:
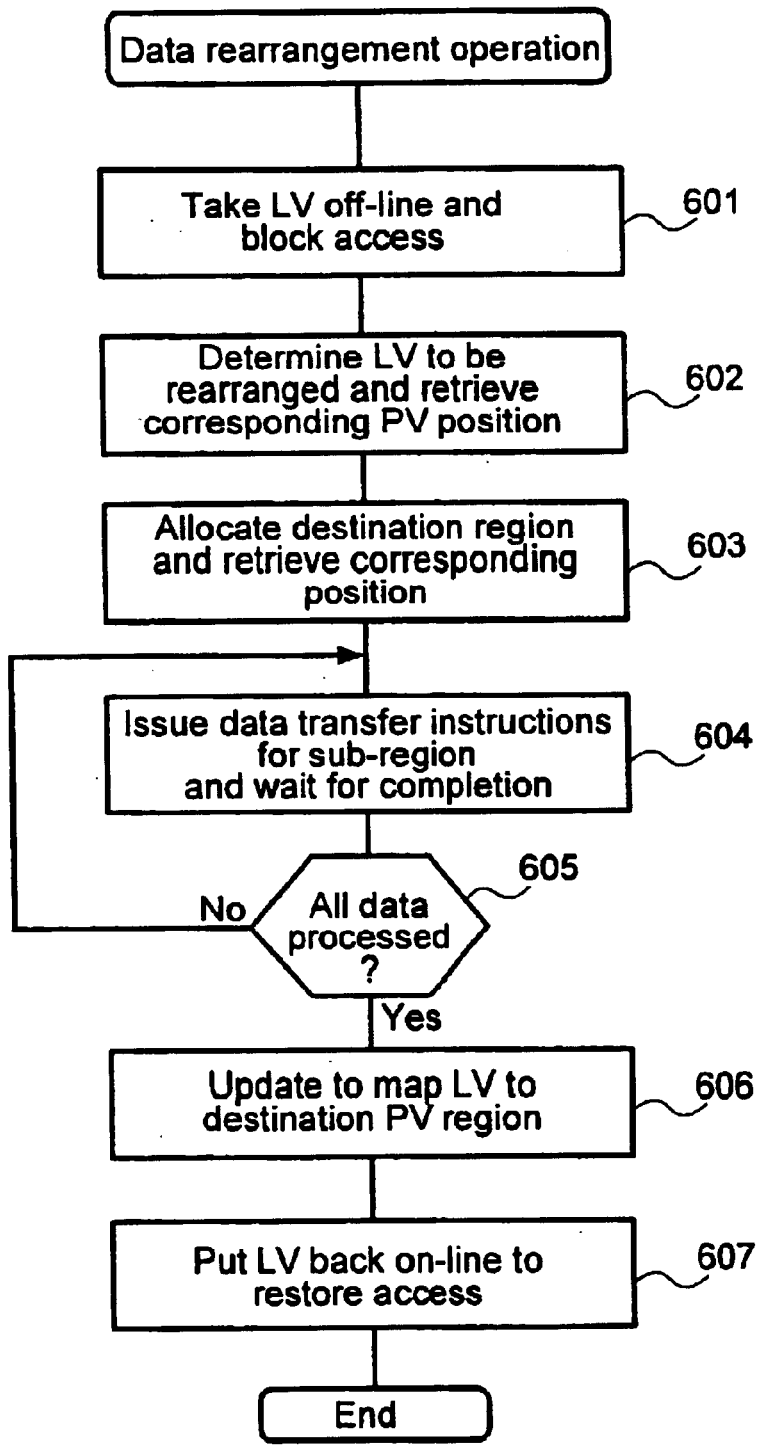
FIG. 6 is a flowchart showing a data rearrangement operation according to a first embodiment of the present invention.

FIG. 6 shows a flowchart of the data rearrangement operation 131 performed by the CPU 101.

The data rearrangement operation 131 is executed when a user or the like gives instructions to rearrange a LV. Before the operation is executed, the data rearrangement operation 131 obtains the LV name of the LV to be rearranged and the PV name of the the destination for the rearranging operation.

To restrict access to the LV being processed, the CPU 101 takes the LV off-line. If the operating system is UNIX, for example, the LV can be taken off-line by unmounting the device (LV) (step 601).

The CPU 101 looks up the LV management information 300 of the LV-PV mapping information 141 and determines the PVs and the PEs containing the LV data. The CPU 101 calculates the LV size from the LE count 302 and the LE size 303. If all or part of the LV is stored in the destination PV, the CPU 101 will not transfer the portion already stored in the destination PV. However, the description below will assume that no portion will be excluded from the transfer operation (step 602).

The CPU 101 allocates PEs on the transfer destination PV according to the size of the region to be transferred from the LV. More specifically, the CPU 101 looks up the PE-LE mapping information 410 in the PV management information 400 to find unallocated PEs for the LEs, thus providing enough PEs to serve as the transfer destination.

PE allocation can be performed simply by storing transfer destination PVs and PEs. However, PEs to be used for the transfer operation must be allocated beforehand in cases where another operation may allocate PEs for other purposes. More specifically, a modification exclusion flag can be provided for each PV to block changes in PE allocations in the PV for a fixed period of time. Alternatively, the relevant PE fields in the PE-LE mapping information 410 can be changed so that they are already allocated to the transfer source LV before the data transfer is completed. (Step 603).

When the destination PV has been allocated, the CPU 101 divides the transfer source PV region into a number of sub-regions and issues requests to the storage device 110 to perform a data transfer for each sub-region. The request to the storage device 110 for data transfer operations is not a standard input/output command provided by an existing protocol, but is a dedicated command that has been newly added for data transfer operation requests. The PV region is divided up from the start of the transfer source region using appropriately sized partitions. The appropriate size is determined from the time required for the data transfer operation requested to the storage device 1110 and the allowable response time for the requesting host 100. A transfer operation request command is issued for each PV, so if the source LV spans multiple PVs, the sub-regions must be divided up so that there are no sub-regions spanning two PVs.

The transfer operation request command contains the starting address and size at the source PV and the PV number, the starting address within the PV, and the data size at the destination PV. Once the data transfer request command has been sent to the storage device 110 through the channel 103, the CPU 101 waits for a completion report from the storage device 110 (step 604).

After receiving the completion report for the data transfer operation request command sent at step 604, the CPU 101 checks to see if data transfers have been completed for the entire region in the source LV. If there is a sub-region for which data transfer has not been completed, CPU 101 returns to the operation at step 604 (step 605).

Once all the data in the region has been transferred, the CPU 101 updates the LV-PV mapping information 141 so that the LV involved in the transfer is mapped to the destination PV. More specifically, the CPU 101 changes the information entered in the PV list 301 of the LV management information 300 to information indicating the destination PV, and changes the information entered in the PV name 312 and the PE number 313 of the LE-PE mapping information 310 to information indicating the PE of the destination PV. The CPU 101 adds the LV involved in the transfer to the LV list 401 of the PV management information 400 for the destination PV, and changes the LV name 412 and the LE number 413 in the PE-LE mapping information to indicate mappings with the LEs in the destination LV. The CPU 101 deletes the LV involved in the transfer from the LV list 401 of the PV management information 400 for the source PV and changes the source PE entries of the PE-LE mapping information 410 to indicate that they are unassigned to LVs (step 606).

Then, the CPU 101 releases the transferred LV from its off-line status, and the operation is exited (step 607).

Figure 7:
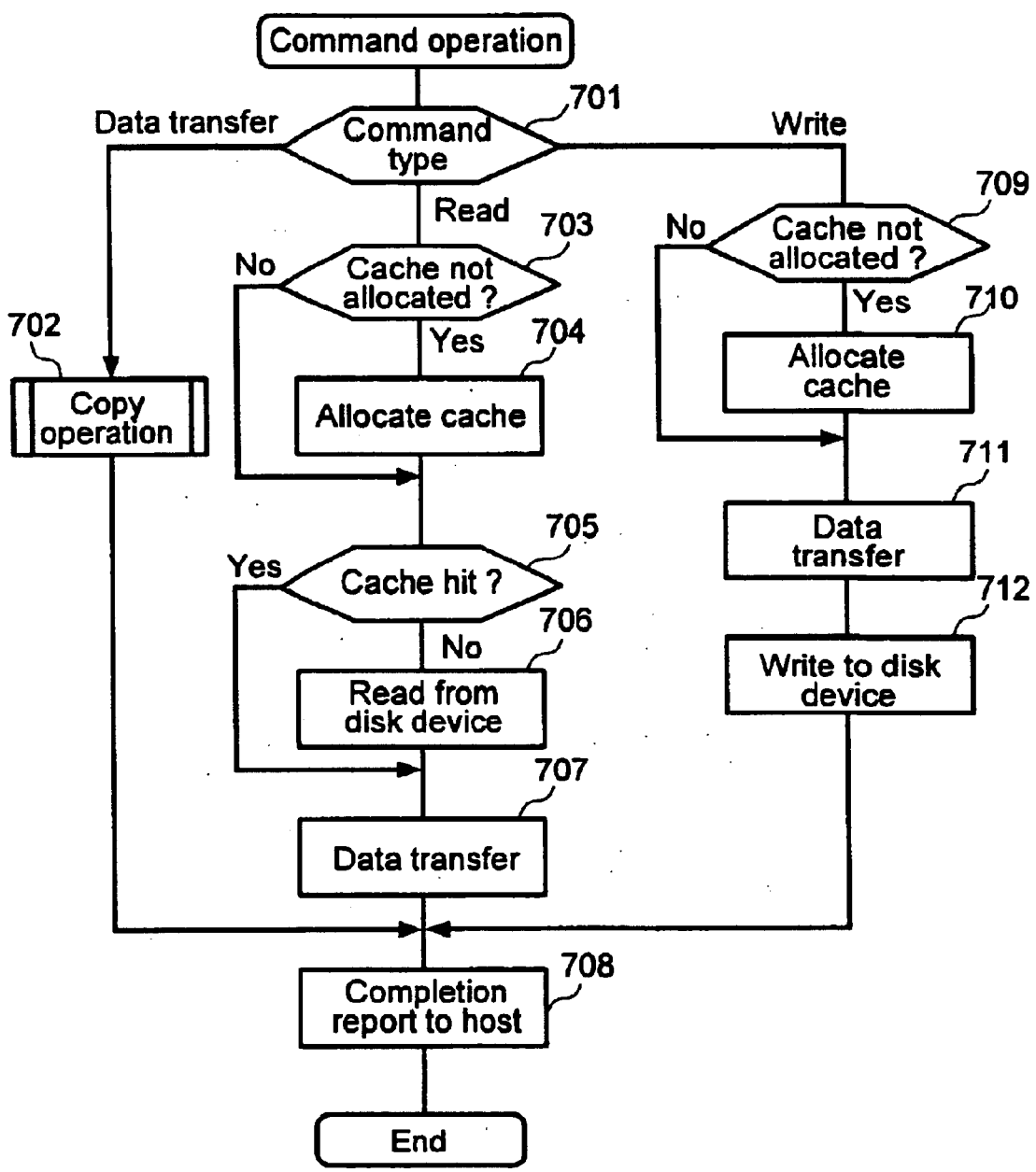
FIG. 7 is a flowchart showing a command operation in a first embodiment of the present invention.

FIG. 7 is a flowchart of the command operation 132 executed by the storage device 110. The command operation 132 is executed when a command from the host 100 is received by the storage device 110.

The storage device 110 checks to see what type of processing request command was issued to the disk device 150 from the host 100 (step 701).

If the command is a data transfer operation request, the storage device 110 runs a copy operation 133 and waits for it to finish (step 702).

If the command is a read request, the storage device 110 checks to see if the data involved in the request is present in the disk cache 113. If necessary, the storage device 110 allocates a cache region, reads the data from the disk device 150 into the allocated cache region, and transfers the data to the host 100 (step 703–step 707).

If the command is a write request, the storage device 110 allocates a cache region in the disk cache 113 and writes the data received from the host 100 to the cache region temporarily. The data is then written to the disk device 150 (step 709–step 712).

The storage device 110 reports to the host 100 indicating that the requested operation has been completed, and the operation is exited (step 708).

Figure 8:
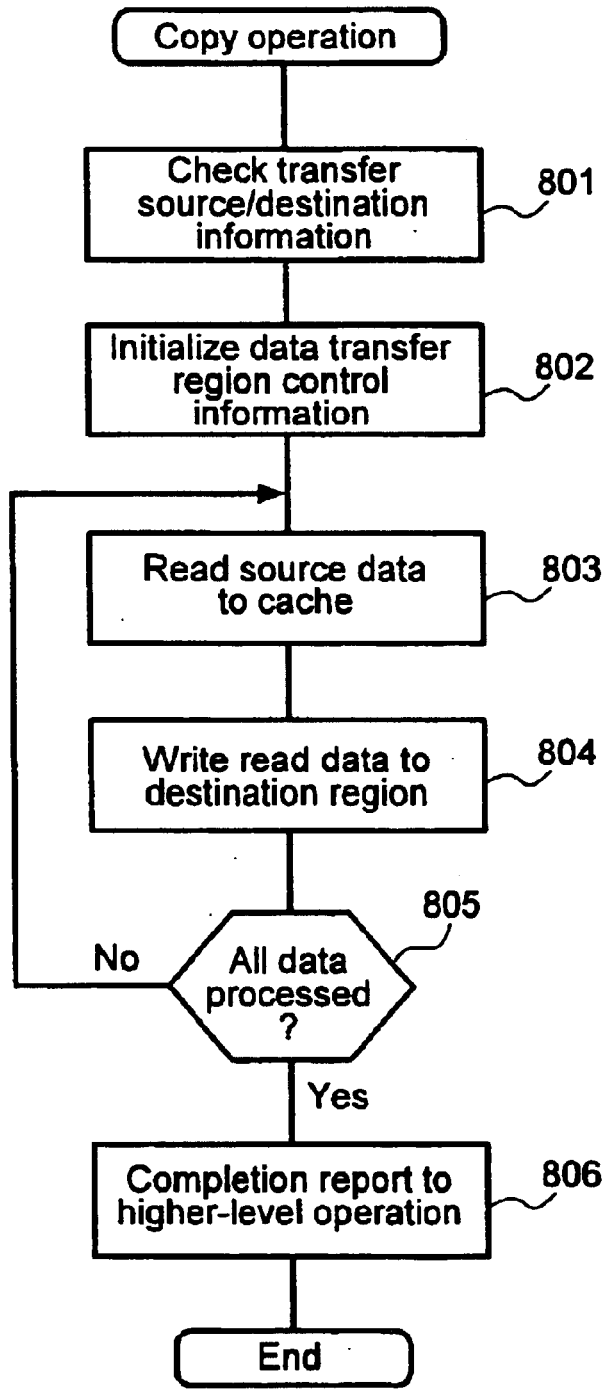
FIG. 8 is a flowchart showing a copy operation in a first embodiment of the present invention.

FIG. 8 is a flowchart of the copy operation 133 performed by the storage device 110.

The copy operation 133 is executed when the storage device 110 receives a data transfer request command.

When the storage device 110 receives a data transfer request, it checks to see if the source/destination data regions specified in the data transfer request are appropriate.

More specifically, the storage device 110 checks to see whether the sizes of the source/destination data regions are the same, whether a region has already been set up as a source/destination data region for a different data transfer request, and the like. If the specified information is not appropriate, the storage device 110 reports an error to the host 100 (step 801).

If no error is discovered, the storage device 110 assigns and initializes a region of the control memory 112 to be used to store the data transfer region information 145 associated with the data transfer operation request. More specifically, the transfer source range information 501 and the transfer destination range information 502 are set up according to the information contained in the received data transfer operation request, and the progress pointer 503 is set to an initial value of 0 (step 802).

Once the settings have been made, the storage device 110 sequentially reads data from the start of the data region in the source disk device 150 to the disk cache 113, and this data is written to the destination disk device 150. Taking into account the overhead involved in positioning the head of the disk devices 150, it would be desirable for the data involved in a single data transfer to be large. However, if too much data is involved in each transfer, there may be a negative effect on other operations accessing data stored on other disk devices 150 connected to the same bus. Thus, the size of the data in a single transfer must take into account estimated processing speed in the copy operation 133 as well as potential effects on other operations (step 803–step 804).

Once the writing of data to the destination is done at step 804, the storage device 110 updates the progress pointer 503 according to the amount of data that has been transferred.

The storage device 110 checks the progress pointer 503 to see if all the data has been copied. If the copying operation has not been completed, control goes to step 804 (step 805).

If the copying operation is completed, the storage device 110 reports to the command operation 132 that the copying operation is done, and the operation is exited (step 806).

In this embodiment, the host 100 needs only to issue an instruction to perform the copy operation. Since the actual data transfer operations are performed by the storage device, the load on the host, the network, and the like can be reduced.

Figure 9:
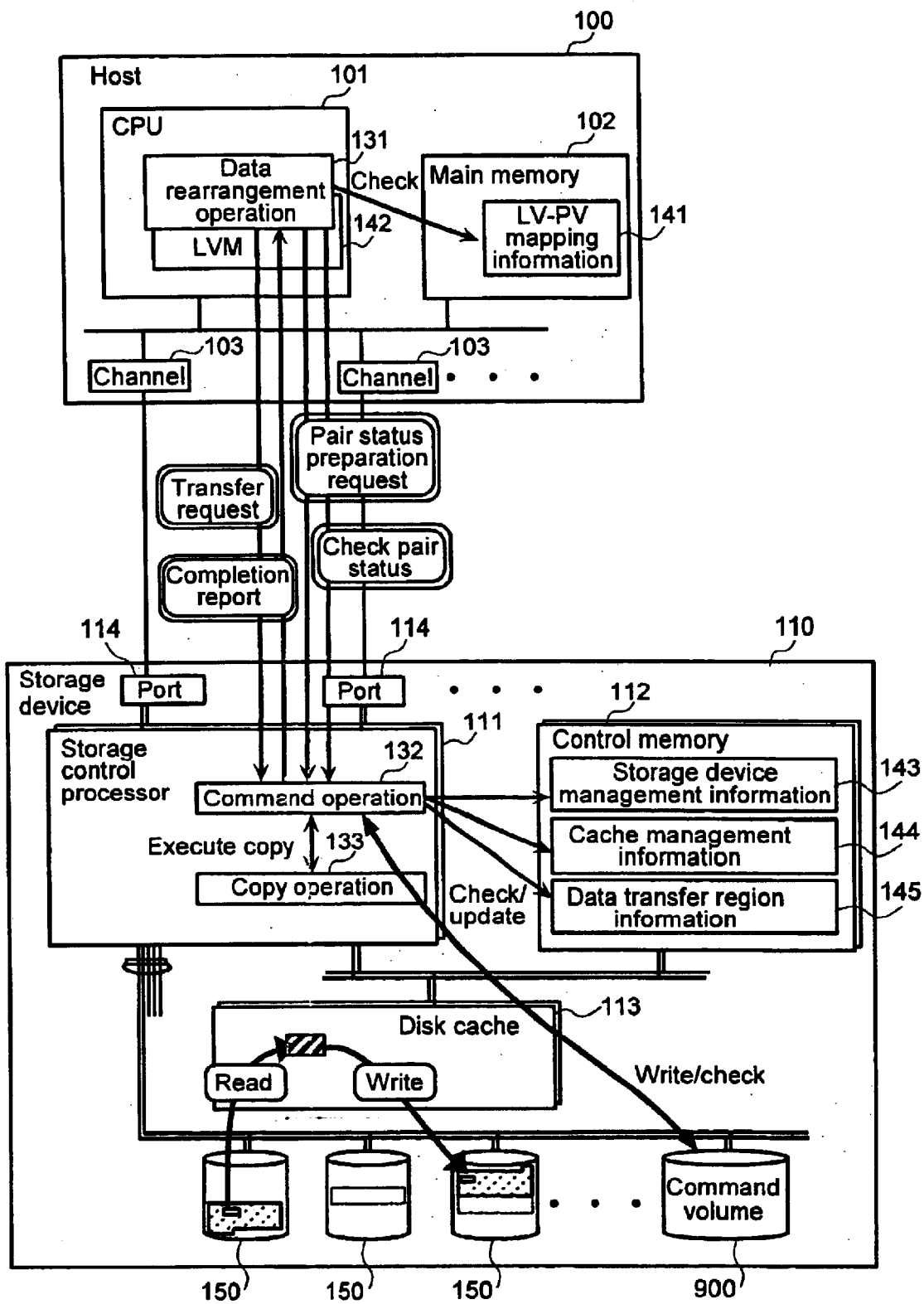
FIG. 9 is a drawing showing the architecture of a computer system according to a second embodiment of the present invention.

FIG. 9 shows an architecture of a second embodiment of a computer system. This embodiment differs from the first embodiment in that the synchronization status 504 and the differential bit map in the data transfer region information 145 are used and in the addition of a command volume 900.

The following is a description of the unique elements of the second embodiment.

The synchronization status 504 contains information indicating synchronization pair status for the source/destination data regions of a data transfer operations. Possible values for synchronization pair status are: "pair not formed"; "pair being formed"; and "pair formed". The "pair being formed" status indicates that the data transfer operation from the indicated source region to the indicated destination region is being executed. The "pair formed" status indicates that the copy operation between the data regions has been completed and that a synchronization pair has been formed. However, if data in the source data region changes while the "pair being formed" status is in effect, the data regions in the synchronization pair may be inconsistent even when the "pair formed" status is in effect. The "pair not formed" status indicates that there is no data transfer instruction for the data regions or that an instruction from the host 100 disabled the synchronization pair after the data transfer was completed. However, this status means that there was no data transfer operation to begin with or that the data transfer operation is finished. Thus, no data transfer region information 145 would be allocated in the control memory 112. As a result, in practice the only settings for the synchronization status 504 are "pair being formed" and "pair formed".

The differential bit map 505 indicates whether there was a data change in the source data region when the "pair being formed" or the "pair formed" status was in effect. To reduce data size, all the data regions in the disk device 150 are divided into smaller regions of a specific size, e.g., 64 KB, and a one-to-one correspondence is established between the smaller regions and individual bits in the differential bit map 505. The differential bit map 505 indicates whether data in the smaller regions has changed or not.

With regard to disk cache allocation, cache management is often simplified by similarly dividing the disk device 150 into smaller regions and assigning cache to these smaller regions. In this case, the bit map can be set up easily by having each bit in the differential bit map 505 mapped to one or more smaller regions, which serve as the cache allocation units.

Special operation requests (e.g., data transfer operation requests) not part of the standard protocol are written as data to the command volume 900. In the first embodiment, data transfer operation requests to the storage device 110 are added as a dedicated command. In this embodiment, data transfer requests are issued to the storage device 110 by using a standard write request and writing a data transfer request as data to the command volume 900.

The storage control processor 111 receives the write request for the command volume 900, interprets the write data as an operation request, and runs the associated operation. If running the requested operation as an extension to the write request provides an acceptable response time, the storage control processor 111 executes the requested operation and sends a single completion report that includes the write request. If the execution time of the requested operation is longer, the storage control processor 111 first sends a completion report for the write operation. Then, the host 100 periodically checks to see if the requested operation has been completed.

Next, the operations of the CPU 101 and the storage control processor 111 in this embodiment will be described.

The data rearrangement operation 131 executed by the CPU 101 and the command operation 132 executed by the storage control processor 111 of the storage device 110 work together to rearrange the LV as in the first embodiment.

Figure 10:
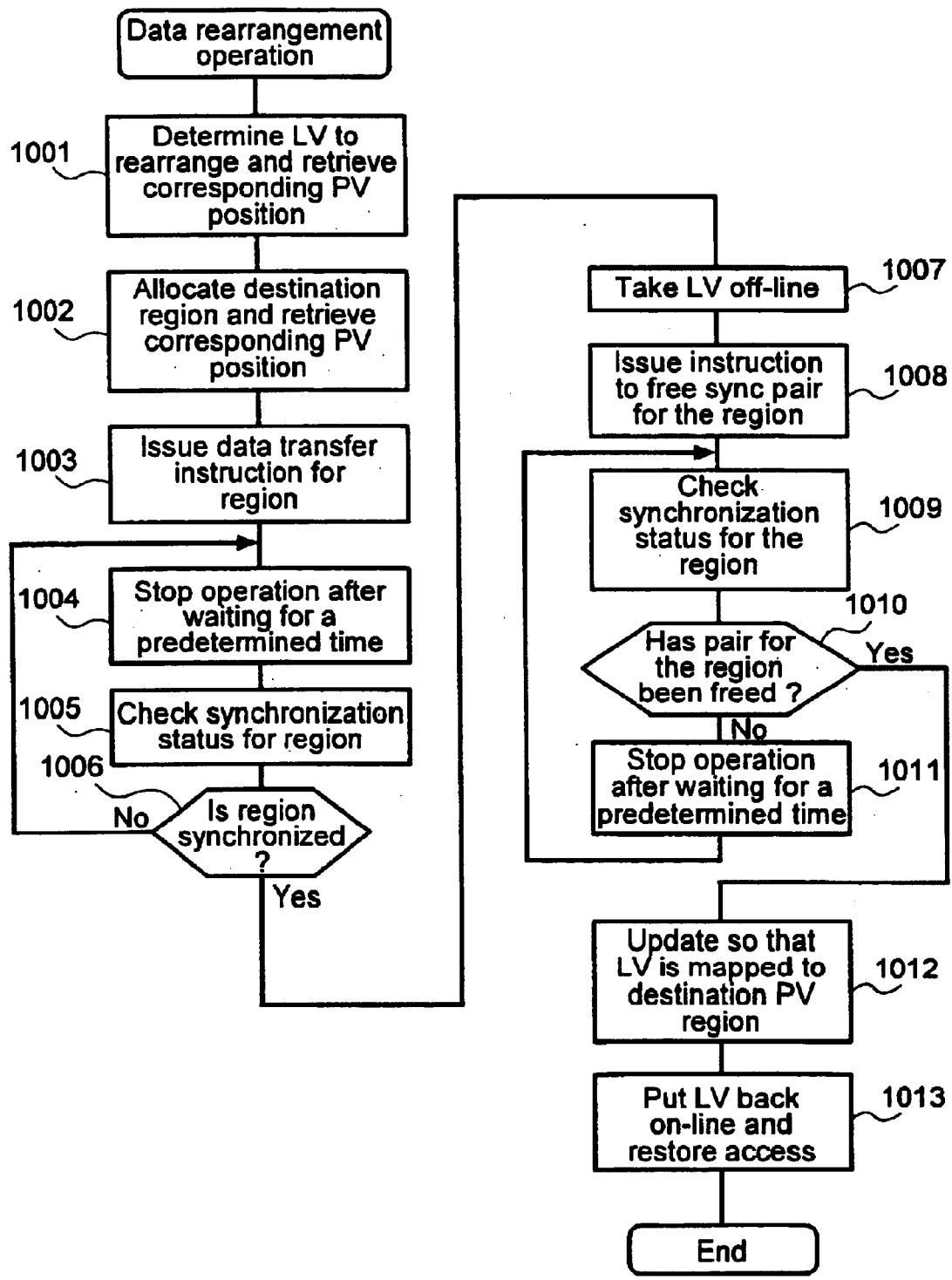
FIG. 10 is a flowchart of a data rearrangement operation according to a second embodiment of the present invention.

FIG. 10 shows a flowchart of the data rearrangement operation 131 of this embodiment.

Step 1001 and step 1002 perform similar operations as step 602 and step 603 from FIG. 6, so their descriptions will be omitted.

The CPU 101 issues data transfer operation requests to the storage device 110 all at once for all PV regions mapped to the LV regions involved in the transfer. The transfer requests contained in the write data to the command volume 900 includes parameters such as the range information for all PV regions mapped to the LV region (a list of position information, consisting of a PV number, a start address, and size, for the sub regions) and the range information for the destination PV regions. When a write request command to the storage device 110 is issued, the CPU 101 waits for a completion report from the storage device 110 (step 1003).

When the completion report is received, the CPU 101 waits for a predetermined time to pass (step 1004). The CPU 101 issues a request to the storage device 110 to check the synchronization pair status of the data transfer region and waits for the request to be completed. To check the synchronization status, the CPU 101 issues a write request to write data to the command volume 900 containing a request to prepare synchronization pair status. After receiving a completion report from the storage device 110, the CPU 101 issues a read request to the command volume 900 (step 1005).

The CPU 101 determines whether the synchronization pair status that was obtained is "pair formed". If so, the CPU 101 performs the operation at step 1007. If the synchronization pair status is not "pair formed", the CPU 101 returns to the operation at step 1004 and waits for the synchronization pair status to be changed (step 1006).

Then, as in step 601, the CPU 101 takes the LV off-line (step 1007).

The CPU 101 uses the command volume 900 to issue a request to free the synchronization pair formed between the source region and the destination region of the data transfer (step 1008). When a completion report from the storage device 110 for the write request command to transfer the synchronization pair request to the command volume 900 is received, the CPU 101 uses the same method as in step 1004 to check the synchronization pair status of the data region (step 1009).

If the retrieved synchronization pair status is not "pair not formed" (step 1010), the CPU 101 waits for a predetermined time to pass (step 1011) and then returns to the operation at step 1009 to retrieve the content of the synchronization status 504 again. If the synchronization status 504 is "pair not formed", the CPU 101 performs the operations starting at step 1012. The CPU 101 updates the LV-PV mapping information 141 for the LV, takes the LV on-line, and completes the LV rearrangement operation.

Figure 11:
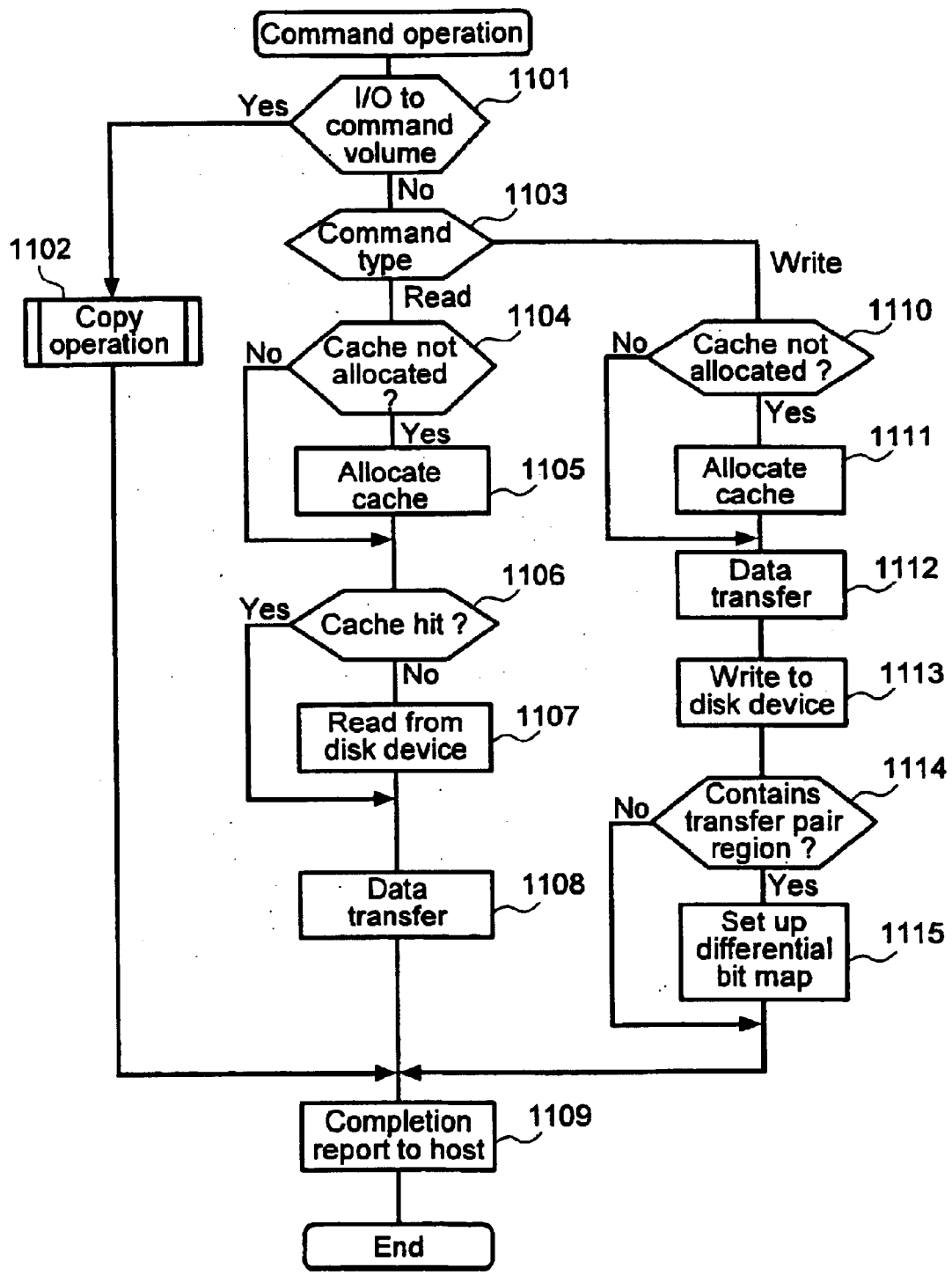
FIG. 11 is a flowchart of a command operation according to a second embodiment of the present invention.

FIG. 11 is a flowchart of the command operation 132.

The storage device 110 checks to see if the command received from the host 100 is meant for the command volume 900 (step 1101).

If the command is meant for the command volume 900, the storage device 110 runs the copy operation and waits for its completion (step 1102).

If the command is not meant for the command volume 900, the storage device 110 determines the command type. If the command is a read or a write command, control goes to step 1104 or step 1110 respectively (step 1103).

If the command type is a read command, the storage device 110 performs a read operation similar to the one from step 703 to step 707 (step 1104–step 1108).

If the command type is a write command, the storage device 110 performs a write operation similar to the one from step 709 to step 712 (step 1110–step 1113).

Step 1114 and step 1115 are unique to this embodiment. During data transfer operations, these steps access LV data involved in a transfer from a different operation performed by the host 100.

The storage device 110 checks whether or not the data to be written contains a data region registered as a data transfer region (step 1114). If a registered data region is included, the storage device 110 determines the updated section of the data transfer region and sets the differential bit map mapped to the updated section (step 1115).

The storage device 110 reports to the host 100 that the requested operation has been completed (step 1109).

Figure 12:
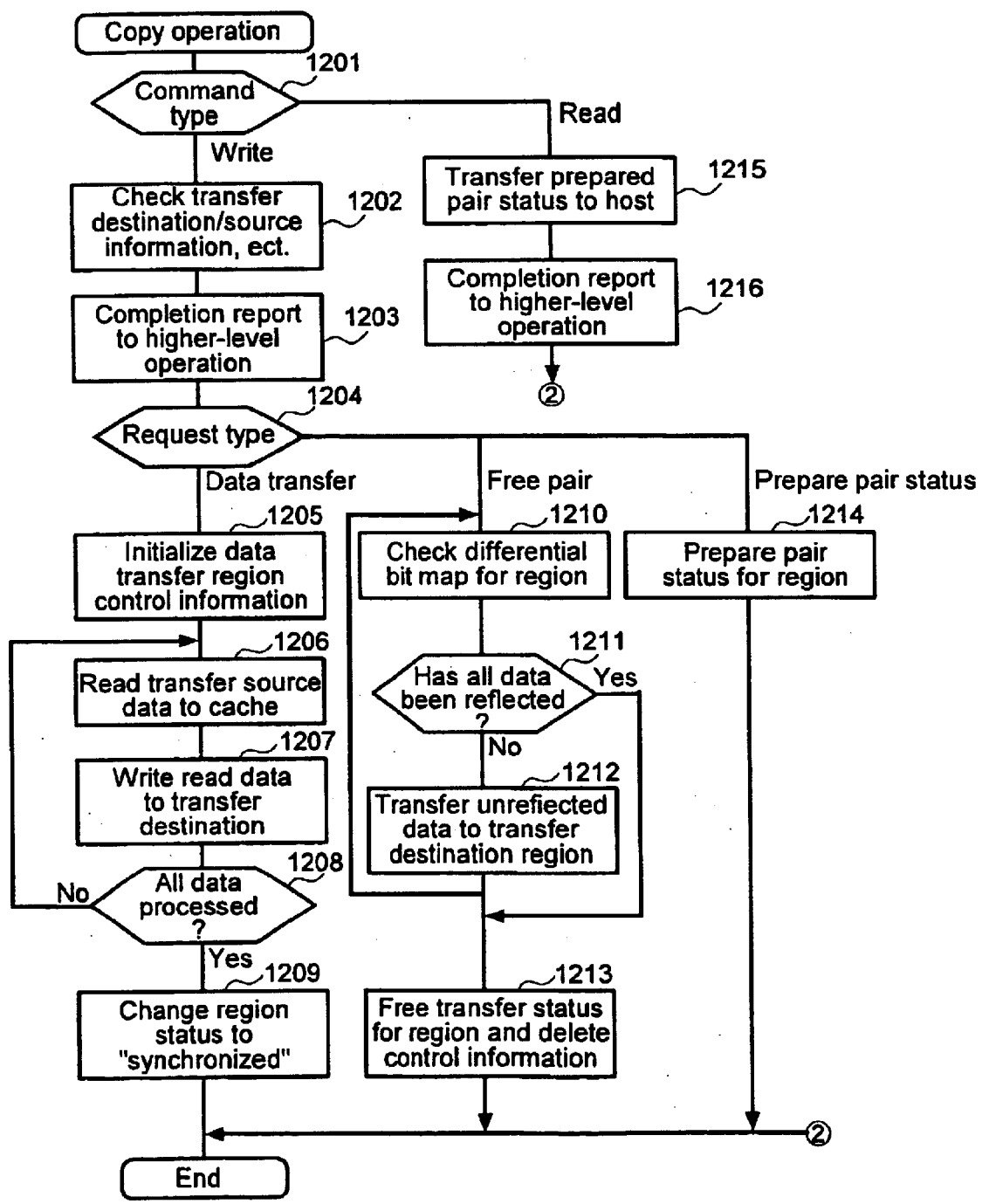
FIG. 12 is a flowchart of a copy operation according to a second embodiment of the present invention.

FIG. 12 shows a flowchart of the copy operation 133.

The storage device 110 determines the command type of the command sent to the command volume 900 (step 1201).

If the command is a write command, the storage device 110 analyzes the contents of the data to be written to the command volume 900 and determines if the requested operation and the specified ranges of the source/transfer data regions are appropriate (step 1202). If there is a problem, the storage device 110 reports an error to the higher level operation and stops the current operation (step 1203).

If there is no problem, successful completion is reported, and the storage device 110 determines the type of requested operation sent in the write data.

If the requested operation is a data transfer operation, the storage device 110 performs the data transfer operation in a similar manner as in step 802 to step 805 in FIG. 8 (step 1205–step 1208). However, in the initialization operation for the data transfer region information 145, the synchronization status 504 is set to "pair being formed" and the differential bit map 505 is cleared to zeros. When the data transfer operation is completed, the storage device 110 changes the synchronization status 504 to "pair formed" and the operation is exited (step 1209).

When the requested operation is to free a pair, the storage device 110 looks up the data transfer region information 145 for the data transfer region pair to be freed and checks to see if any part of the differential bit map 505 is set to ON (step 1210). If there are any bits set to 0 in the differential bit map 505, i.e., there is an unsynchronized section in the source/destination data transfer regions, the data that has not been synchronized yet is transferred to the destination data region (step 1212). The storage device 110 returns to step 1210 and rechecks the differential bit map 505.

When the source/destination data transfer regions have been synchronized, the storage device 110 clears the data transfer region information 145 for the data regions, releases the region in the control memory 112 storing the data transfer region information 145, and exits the operation (step 1213).

If the requested operation is to prepare pair status, the storage device 110 prepares the synchronization pair status for the requested data transfer regions (step 1214). If the data transfer regions still exist and a memory region in the control memory 112 is assigned, the synchronization status 504 is used as the synchronization pair status. If a data transfer region does not exist and no memory region is allocated, "pair not formed" is used as the synchronization pair status. The synchronization pair status prepared at step 1214 is transferred as the read data in a read request issued to the command volume 900 (step 1215, step 1216).

According to this embodiment, the off-line time for the LV is shorter than in the first embodiment, and the LV can be rearranged without increasing loads to the host and the like.

A third embodiment will be described.

The system architecture of the third embodiment is essentially identical to that of the first and the second embodiments. However, in this embodiment, the storage device 110 manages storage regions in the disk devices 150 not used by the host 100. The storage device 110 receives instructions from a user or a maintainer indicating conditions for the data region to be used as a transfer destination PV, e.g., region size, the logical unit number in which the region is stored, the number of the connection port 114 used for the connection, and the disk type. The storage device 110 selects a data region not used by the host 100 that fulfills the conditions indicated by the user and presents it to the user or the maintainer. This aspect differs from the first and the second embodiments. The following is a description of how the information in the storage device 110 is presented.

The storage device 110 saves and maintains a used region management information containing a list of numbers of the disk devices 150 not used by the host 100.

When an instruction to allocate a region is received by the storage device 110 from a user or a maintainer, the following operations are performed.

Based on the region allocation instruction, the storage device 110 searches the unused region management information and selects an unused disk device 150 that fulfills the conditions (step 1-1).

The storage device 110 reports the selected disk device 150 number to the user or the maintainer (step 1-2).

The user or the maintainer obtains the unused disk device 150 number from the storage device 110 and issues a data transfer instruction according to the procedure below.

The user or the maintainer sets up operating system management information for the unused disk device 150. For example, in a UNIX operating system, a device filename is defined for the unused disk device 150 (step 2-1).

The user or the maintainer defines the disk device 150 for which operating system information has been set up as a PV to allow a LVM to be used (step 2-2).

The user or the maintainer indicates the newly defined PV as the transfer destination and issues a data transfer instruction according to the present invention to the storage device 110 (step 2-3).

When the data transfer operation is completed, the user or the maintainer issues an instruction to update the LV-PV mapping information 141 (step 2-4).

In a system implementing this embodiment such as a RAID device, the storage device 110 may involve a logical disk device formed by all or part of the storage regions in the multiple disk devices 150 are presented to the host 100. In this case, the unused region management information is formed from a list consisting of the disk device 150 number containing an unused region, a starting region, and a region size.

The storage device 110 allocates an unused region as follows.

The storage device 110 searches for an unused region in a disk device 150 that fulfills the conditions in the region allocation instruction.

If the indicated size cannot be allocated, the storage device 110 informs the user that allocation cannot be performed, and the operation is exited (step 3-2).

If a disk device 150 that fulfills the indicated conditions is found, the storage device 110 checks the size of the unused region in the disk device 150. If the size is sufficient for the indicated size, the indicated size is allocated.

More specifically, the storage device 110 removes the allocated region from the unused region management information. If the unused region size for the disk device 150 is insufficient for the indicated size, the entire unused region is allocated, a different disk device 150 is retrieved, and an unused region fulfilling the conditions is allocated (step 3-3).

The storage device 110 repeats the operation at step 3-3 until the indicated data region size is allocated (step 3-4).

A logical disk device formed by the allocated regions is defined by having the storage device 110 registering the allocated regions to the logical/physical conversion tables belonging to the corresponding disk devices (step 3-5).

The storage device 110 reports to the user or the like with information about the defined logical disk device (step 3-6).

The unused region allocation instruction to the storage device 110 can be issued as a dedicated command as in the first embodiment or can be issued by writing a command to a command volume as in the second embodiment. Alternatively, a service processor can be connected to the storage device 110 for maintenance purposes, and commands can be issued from the service processor.

The series of operations from step 1-1 to step 3-4 can take the form of a script. In this case, the user or the maintainer indicates destination data region selection conditions in more detail to select the destination data region and have data transfer performed automatically. The conditions of the destination data region can include continuity of storage regions in the storage device 110, the physical capacity of the disk device 150 in which it is stored, access characteristics such as head positioning time and data transfer speed, and the like. For RAID devices, conditions relating to physical architecture such as RAID levels can also be included in the destination data region conditions. It would also be possible to have a condition for specific LV and physical structures, i.e., no sharing of the disk devices 150, the internal bus connecting the disk devices 150, and the storage control processor 111.

In a modification to the third embodiment, it would be possible to have the user not specify a destination region and instead specify only the source LV and conditions for selecting a destination region. In this case, the storage device 110 selects a destination region according to the selection conditions and transfers data to a newly created logical disk device. When the data transfer is completed, the storage device 110 reports the completion of the transfer and information about the region selected as the destination to the host 100. The host 100 receives the report and performs the operations in step 2-1, step 2-2, and step 2-4 for the reported destination logical disk device to complete the LV move. At step 2-2, the PV must be defined while the data in the logical disk device is still valid.

The present invention is not restricted to the embodiments described above, and various modifications may be effected within the spirit of the invention.

In the embodiments above, the PVs and the logical disk devices provided by the host 100 have one-to-one relationships with the actual disk devices 150. However, the PVs may be set up with a RAID structure in the storage device 110, e.g., level 5 RAID. In such cases, the host 100 issues I/O operations to the logical disk devices provided by the storage device 110. The storage control processor 111 performs logical/physical conversion on the I/O instructions to the logical disk devices to provide I/O instructions for the disk devices 150.

In the embodiments above, data rearrangement is illustrated with rearrangement in LVs managed by an LVM. However, it would also be possible to use the present invention in other data rearrangement operations such as defragmenting PEs unassigned to LVs (garbage collection) and rearranging database tables managed by a DBMS.

In the first embodiment, dedicated commands are used to send data transfer operation requests from the host 100 to the storage device 110. In the second embodiment, the command volume 900 is used. It would also be possible the switch the two methods between the embodiments.

In the embodiments above, it is assumed that there is one destination PV, but it would also be possible to have multiple PVs. In such cases, the manner in which the source data is to be divided up between the multiple PVs must be indicated. Possible methods for dividing up data for multiple PVs include dividing up the data evenly between all PVs and following a specified sequence of PVs filling up each one to capacity. When data is to be divided up evenly, there is a choice of storing the data in the PVs continuously or splitting up the data according to a predetermined size and storing the divided data sequentially in the PVs as in RAID striping.

It would also be possible to have a user or maintainer allocate a continuous region in the PEs to serve as the transfer destination and then have this information passed as a parameter to the data rearrangement operation 131. Alternatively, the garbage collection of empty PEs described above can be performed in the data rearrangement operation.

In the embodiments above, it is assumed that there will be no accessing of the destination data region. In other words, no consideration is given to the blocking of access to the destination data region in the storage device 110. If the destination data region is accessed, data reads/updates will take place directly to the accessed region. However, for cases where there is no assurance that the host 100 will block access, it would be possible for the storage device 110 to reject I/O operations on data regions registered as data transfer destination data regions. Conversely, it would also be possible to have the host 100 update the LV-PV mapping information to a post-rearrangement status before the transfer operation is completed, thus having accesses to the LV involved in the transfer handled at the destination PV. In this case, a data transfer region pair is formed at the storage device 110 and data is copied for synchronization as in the second embodiment. However, read requests to the destination region must reflect data in the source region and write requests to the destination region must be reflected in the source region.

With this embodiment, LV rearrangement operations can be performed while taking the LV off-line for a shorter timer than usual, and the usefulness of the system can be improved.

With a computer system according to the present invention, when data stored in a storage device is moved to a different region, the data transfer operation is performed within the storage device. This reduces the load on the host and channels.

Also, with a computer system according to the present invention, a data transfer for data rearrangement can take place while allowing access to the data. As a result, the downtime for accessing data during a data rearrangement operation can be reduced.

What is claimed is:

1. An information processing system comprising:
   a host computer; and
   a storage system connected to said host computer and including a plurality of disk devices and a controller coupled to said plurality of disk devices;
   wherein said host computer includes:
   means for storing mapping information between said plurality of disk devices and logical storage regions;
   means for determining a logical storage region and physical storage regions in disk devices corresponding to the determined logical storage region in which data to be transferred to another physical storage region is stored by referring to said mapping information;
   means for obtaining information indicating a destination physical storage region in a disk device to which data of the determined logical storage region is transferred; and means for instructing said storage system to transfer data of the determined logical storage region from the determined physical storage regions corresponding to the determined logical storage region to the destination physical storage region, said means for instructing issuing a transfer operation request for each of the determined physical storage regions corresponding to the determined logical storage region; and said storage system includes:

means for transferring data from the determined physical storage regions to the destination physical storage region.

2. An information processing system according to claim 1, wherein said storage system includes means for notifying said host computer that said means for transferring has finished and said host computer includes means for updating said mapping information between disk devices and logical storage regions according to the received notification from said storage system.

3. An information processing system according to claim 2, wherein said host computer includes means for stopping accessing to data being transferred by said means for transferring.

4. An information processing system according to claim 3, wherein said transferring means includes means for issuing instructions for writing said information to predetermined disk device out of said plurality of disk devices; and said storage system includes:

a disk device for storing a request issued from said means for instructing; and means for executing a request stored in said disk device for storing a request; and said means for instructing includes means for writing transfer operation requests to said disk device for storing a request.

5. An information processing system according to claim 4, wherein said storage system includes:

means for recording accesses, which records storage area storing data updated during data transferring process by said means for transferring; and means for matching data of the determined physical storage regions and the destination physical storage region according to said means for recording accesses.

6. An information processing device connected to a storage system including a plurality of disk devices comprising:

means for storing mapping information between said plurality of disk devices and logical storage regions;

means for determining a logical storage region and physical storage regions in disk devices corresponding to the determined logical storage region, in which data to be transferred to another physical storage region is stored by referring to said mapping information;

means for obtaining information indicating a destination physical storage region in a disk device to which data of the determined logical storage region is transferred; and means for instructing said storage system to transfer data of the determined logical storage region from the determined physical storage regions corresponding to the determined logical storage region to the destination physical storage region, wherein said means for instructing issues a transfer operation request for each of the determined physical storage regions corresponding to the determined logical storage region;

means for receiving completion of data transfer from said storage system; and means for updating said mapping information between said disk devices and said logical storage regions according to the received completion of data transfer.

7. An information processing device according to claim 6, wherein said means for obtaining includes: means for searching the destination physical storage region in a disk device that has not been assigned to a logical storage region: and retrieves information indicating the destination physical storage region found by said means for searching.

8. An information processing device according to claim 7, wherein said means for instructing issues write requests for writing transfer operation requests into a predetermined disk device of said storage system; so that said storage system reads a transfer operation request from said predetermined disk device and executes it.

9. In an information processing system including a host computer and a storage system including a plurality of disk devices, a method for rearranging logical storage region in said plurality of disk devices comprising the steps of:

in said host computer storing mapping information between logical storage regions and physical storage regions in said plurality of disk devices:

determining a logical storage region and physical storage regions in disk devices corresponding to the logical storage region, in which data to be transferred to another physical storage region is stored, by referring said mapping information;

obtaining a information indicating a destination physical storage region in a disk device to which data of the determined logical storage region is transferred; and instructing said storage system to transfer data of the determined logical storage region from the determined physical storage regions corresponding to the determined logical storage region to the destination physical storage region;

in said storage device, transferring data from the determined physical storage regions to the destination physical storage region.

10. A method according to claim 9, wherein the instructing step includes a step of issuing a data transfer request to said storage system for each of the determined physical storage regions.

11. An information processing system comprising: a host computer; and a storage system connected to said host computer and including a plurality of disk devices and a controller coupled to said plurality of disk devices;

wherein said host computer includes:

a storing component to store mapping information between said plurality of disk devices and logical storage regions, a determining component to determine a logical storage region and physical storage regions in disk devices corresponding to the determined logical storage region, in which data to be transferred to another physical storage region is stored, by referring said mapping information, an obtaining component to obtain information indicating a destination physical storage region in a disk device to which data of the determined logical storage region is transferred, and an instructing component to instruct said storage system to transfer data of the determined logical storage region from the determined physical storage regions corresponding to the determined logical storage region to the destination physical storage region; and wherein said storage system includes a transferring component to transfer data from the determined physical storage regions to the destination physical storage region according to the instruction received from said host computer.

* * * * *